Oct. 2, 1934.  G. C. JETT  1,975,209
CRAWLER TREAD MECHANISM
Filed Aug. 31, 1932   2 Sheets-Sheet 1
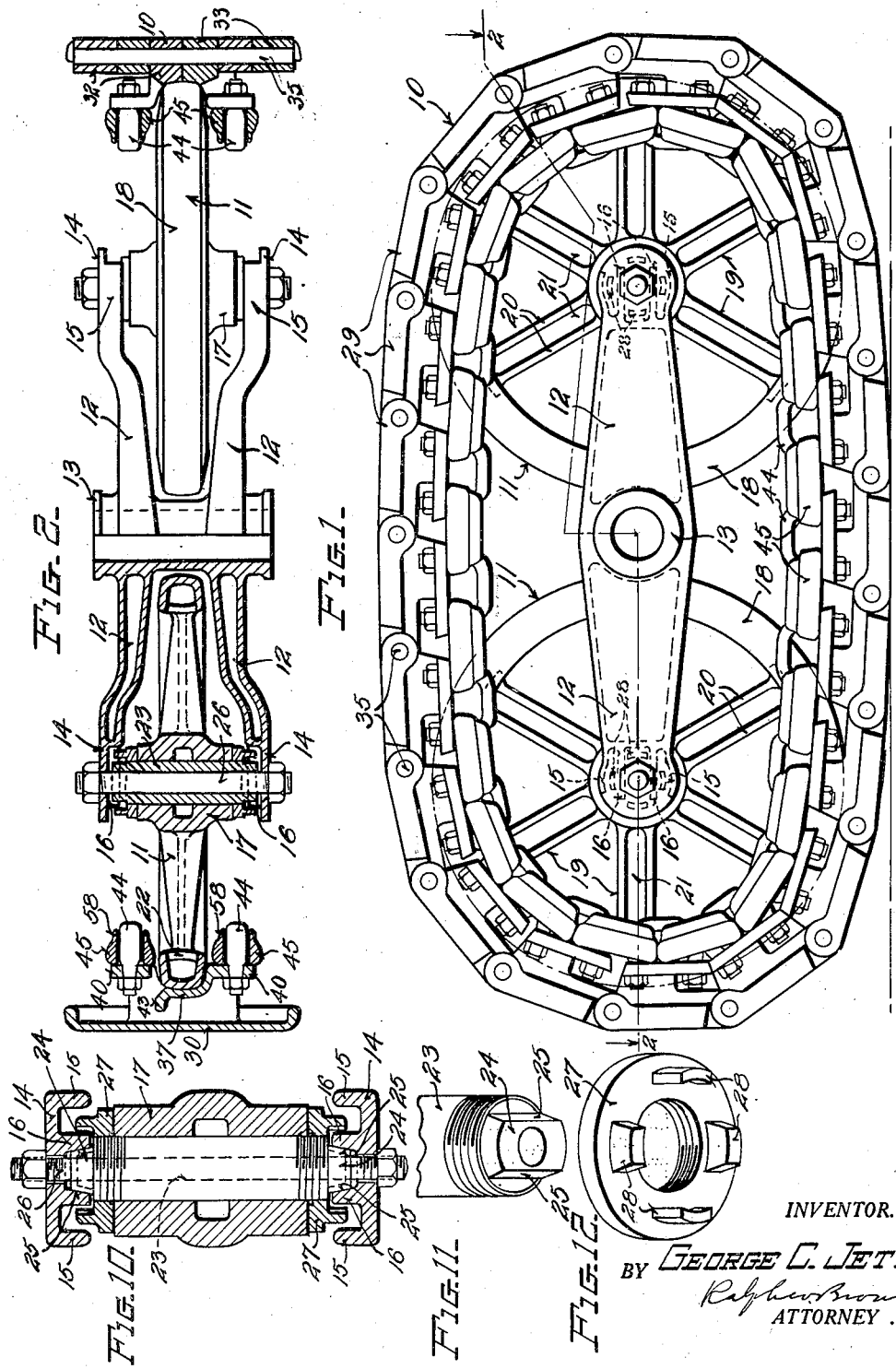
INVENTOR.
GEORGE C. JETT
BY Ralph W. Brown
ATTORNEY.

Oct. 2, 1934.     G. C. JETT     1,975,209
CRAWLER TREAD MECHANISM
Filed Aug. 31, 1932     2 Sheets-Sheet 2
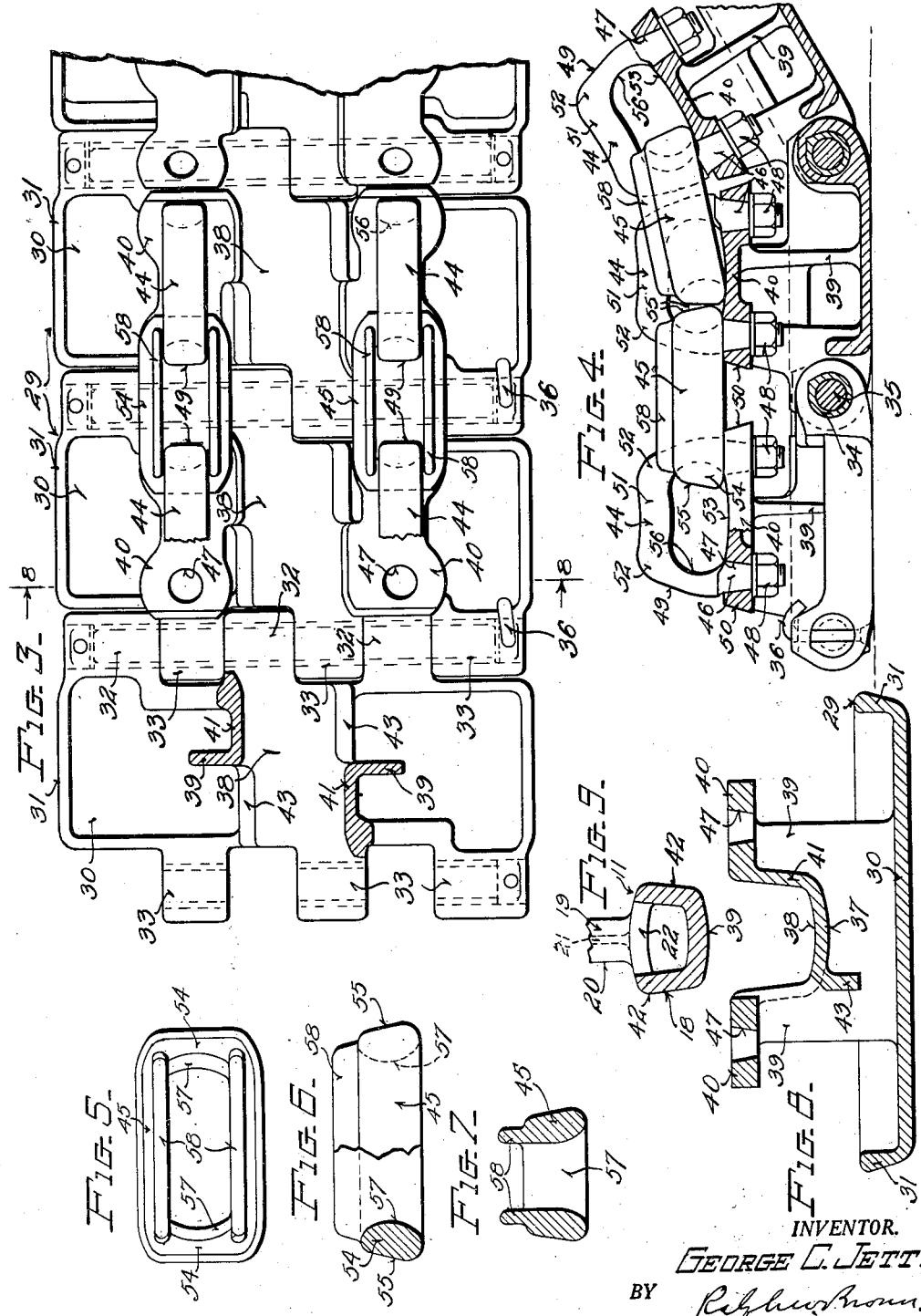
INVENTOR.
GEORGE C. JETT
BY
ATTORNEY.

Patented Oct. 2, 1934

1,975,209

UNITED STATES PATENT OFFICE 1,975,209

CRAWLER TREAD MECHANISM

George C. Jett, Milwaukee, Wis.

Application August 31, 1932, Serial No. 631,146

8 Claims. (Cl. 305—10)

This invention relates to crawler tread mechanisms and particularly to self-sustaining or truss type tread belts therefor.

In my copending application, Serial No. 240,141, I have disclosed an improved crawler tread mechanism having a truss type tread belt wherein the truss action is effected by the use of a chain of interlooped links applied in a novel manner to the inner side of the tread belt. A general aim of the present invention is to further improve the construction and operation of crawler tread mechanisms of that type.

In the tread mechanism disclosed in my said prior application, a single truss chain is employed, centrally applied to the inner side of the tread belt, and double-rimmed end rollers or tumblers straddle the chain and bear upon the belt along spaced paths at opposite sides of the chain. The capacity, wear resisting qualities, and consequent life of a tread belt of such design is dependent largely upon the size of the truss chain and particularly upon the size of the abutting truss sustaining faces or areas at the ends of the chain links.

I have found, however, that the use of large or extended truss sustaining faces on the chain links affords increased opportunity for the lodgement of clay, stones, grit, and other foreign matter therebetween, and that such lodgement not only increases wear, but also causes clogging and consequent fore-shortening of the truss chain, in some instances to such an extent as to materially impair functioning of the belt.

One object of the present invention is to reduce this clogging tendency, particularly in the truss chain. This I have accomplished by the use of a peculiar link formation which discourages the admission of foreign matter between the truss sustaining faces of the chain links, and also by materially reducing the size of those faces so as to permit them to more readily eject such foreign matter as may find its way between them. By the use of a plurality of truss chains so applied to the tread belt as to jointly sustain the truss load, I am enabled to materially reduce the size of the individual faces without reducing the total truss sustaining areas and, consequently, without sacrificing the load sustaining capacity or wear resisting qualities of the truss belt.

Another object is the provision of an improved chain construction for the purposes described which will afford a self-guiding function for the individual links in such manner that they are securely retained in proper alignment under all conditions of operation.

Another object is the provision of a truss type tread belt of the character described which will permit the use of single rimmed end rollers or tumblers. This I have accomplished by the use of a double truss chain whose strands are spaced apart to leave a central track for the end rollers therebetween. Such an arrangement permits the use of single end rollers of simple, light, and economical design, and results in a construction wherein the load is advantageously applied centrally of the tread belt.

Another object is the provision of an improved track and roller construction in a crawler mechanism of the truss belt type which will permit free limited rocking movement between the rollers and belt to permit the latter to more readily accommodate itself to irregularities in the ground or other tread surface.

Another object is the provision of an improved flanged roller track in a truss type tread belt so designed as to effect a secure guide for the rollers and at the same time provide for the ready automatic ejectment of foreign matter therefrom so as to avoid clogging.

Another object is the provision of a truss type tread belt of the character mentioned having hinged tread shoes so constructed and arranged as to provide a continuously smooth track for the rollers.

Other objects are to provide an improved end roller of simple, light weight, sturdy, and economical design for crawler mechanisms particularly of the truss belt type, to provide improved mounting means for the end rollers, and to provide a simple, light, and rigid frame for crawler mechanisms of the character mentioned.

Additional more specific objects and advantages will appear, either expressed or inherent, from the following description of an illustrative embodiment of the present invention.

In the accompanying drawings:—

Figure 1 is a side elevation of a crawler tread mechanism constructed in accordance with the present invention.

Fig. 2 is a longitudinal sectional view thereof taken substantially along the line 2—2 of Fig. 1.

Fig. 3 is a view in elevation, partly in section, on a larger scale, of a portion of the tread belt shown in Fig. 1, looking at the inner side thereof.

Fig. 4 is an edge elevation, partly in section, of a portion of the tread belt.

Fig. 5 is a top plan view of one of the tread belt links.

Fig. 6 is a side view, partly in section, of the same link.

Fig. 7 is a transverse section of that link.

Fig. 8 is a transverse section of one of the tread belt shoes, taken substantially along the line 8—8 of Fig. 3.

Fig. 9 is a sectional view of a fragment of an end roller or tumbler, showing particularly a rim and spoke connection thereof.

Fig. 10 is a longitudinal section of a roller hub and its mounting means.

Fig. 11 is a perspective view of one end of the hub bearing.

Fig. 12 is a similar view of an end collar for the bearing.

The crawler tread mechanism shown comprises an endless, truss type, tread belt 10 trained about a pair of end rollers 11, each of which is journalled between the ends of a pair of legs 12, constituting integral parts of a cast metal H-frame. The H-frame is provided with a central hollow hub 13 from which the pairs of legs 12 project in opposite directions and by which the frame and rollers may be rockably mounted upon an appropriate supporting shaft, not shown.

The legs 12 of the frame are preferably hollow for the most part and each is provided at its free end with an extended tongue 14 reinforced by upper and lower edge flanges 15, and by a pair of intermediate, spaced, horizontal ribs 16, which latter perform an additional function to be later mentioned.

Each end roller 11 preferably comprises a metal casting having a central hollow hub 17 and a hollow rim 18 integrally connected by radial spokes 19. Each spoke is preferably I-shaped in cross section and comprises a pair of spaced longitudinal flanges 20 connected by an intermediate longitudinal web 21. The flanges 20 of each spoke are preferably connected to the side walls of the hollow rim 18 through short slender cross members 22 which afford limited flexibility sufficient to prevent dangerous internal stresses that might otherwise be set up in the roller as a result of the heat treating process to which the roller rim is subjected to harden the wearing surfaces thereof.

The hub 17 of each end roller is journalled upon a bearing sleeve 23 having an integral rib 24 extending across each end thereof. Each rib 24 is designed to fit between the pair of ribs 16 on one of the frame tongues 14, and each is preferably provided with sloping sides 25 so that it may be drawn into tight wedging relation with and between the ribs 16 by drawing up tightly on a tie bolt 26 which extends through the bearing 23 and through the tongues 14. Each bearing 23 is thus securely fixed to the mounting frame and locked against rotation.

Each roller hub 17 is also confined between two adjustable end collars 27 threaded upon the opposite ends of the bearing sleeve 23. Each collar 27 is preferably provided with two pairs of circularly spaced lugs 28 which project from the outer face thereof so as to interlock with the ribs 16 to prevent rotation of the collar. The arrangement of the lugs 28 is such that either diametrically opposite pair on one collar may project between the ribs 16 of the adjacent frame tongue 14 while the other pair is disposed outside of those ribs. Each collar is thus permitted a quarter turn adjustment.

In order to effect a very fine adjustment of the spacing between the end collars 27, with a consequent fine adjustment of the clearance between them and the confined roller hub 17, the pitch of the screw threads, upon which the two collars are mounted, are different. The threads of one, for instance, may be cut ten to the inch while those of the other are cut twelve to the inch, and by simultaneous adjustment of both collars this difference in thread pitch may be utilized to effect an extremely fine adjustment of the spacing between collars.

Either roller 11 with its bearing 23 may be readily removed, after withdrawing its tie bolt 26, merely by withdrawing the assembled hub 17, bearing 23, and end collar 27 in a direction lengthwise of the ribs 16, and this assembly may as readily be replaced in the frame. While withdrawn the end collars 27 may of course be adjusted in the manner above described.

The tread belt shown comprises a series of hinged shoes 29, each having a laterally extended tread plate 30, reinforced by upstanding edge flanges 31 which merge into integral hinge lugs 32 and 33, projecting from the forward and rear edges of each shoe. The forwardly projecting hinge lugs 32 of each shoe intermesh with the rearwardly projecting lugs 33 of an adjacent shoe, and are hingedly connected by a bushing 34 and hinge pin 35. In this instance, each hinge pin 35 is releasably confined by and between appropriate lock pins 36, releasably fixed in the outer hinge lugs of the shoes.

Each shoe is also provided in this instance with a centrally disposed integral track plate 37, spaced above the tread plate 30, for coaction with the end rollers 11. The upper exposed face 38 of each track plate 37 is preferably transversely curved, as indicated in Fig. 8, to form a slightly concave surface to substantially match the convex surface 39 on the roller rim 18, so as to permit a limited rocking action between roller and track, but each face 38 is substantially straight longitudinally and merges into the top faces of the adjacent central hinge lugs 32 and 33 of the shoe, the top faces of those lugs being similarly fashioned to form in effect an extension of that transversely curved longitudinally straight surface 30. The track surface 30 on each shoe is thus of a length greater than a shoe pitch, or in other words of a length greater than the distance between hinge centers.

It will thus be noted that when the shoes are in position to form a runway or track for the rollers, the rear central hinge lug 33 of one shoe cooperates with the adjacent forward central lug 32 of the next shoe to form a continuation of the track surface 38, and the abutting faces of those lugs lie in the central longitudinal axis of that surface, so that each roller, in passing from one shoe to the next, smoothly engages the central forward lug of the next shoe before leaving the rear lug of the last shoe. The track plates 37 and adjacent central hinge lugs thus together form a smooth continuous track for the rollers.

The track plate 37 of each shoe is supported intermediate its ends by a pair of vertical webs 39 which rise from the tread plate 30 and additionally support a pair of laterally spaced bracket plates 40 disposed above the track plate 37. Each of the webs 39 is disposed at a right angle to and merges into a guide flange 41 (Figs. 3 and 8) which rises from an edge of the track plate 37 and merges into one of the bracket plates 40.

The guide flanges 41 cooperate with the side faces 42 of the roller rims 18 to guide the same. The two guide flanges 41 of each shoe are disposed in staggered relation at opposite sides of the track plate 37 and extend from opposite ends thereof only to the intermediate webs 39.

The remainder of each track plate edge terminates in a down turned lip 43 over which foreign matter may be freely discharged by the action of the rollers as they pass along the track plates 37. A channelled roller track is thus provided having staggered openings which effectively prevent clogging.

It will be noted that the two vertical webs 39, integrally connected as they are with the guide flanges 41 and the track and tread plates, provide extremely rigid braces for the guide flanges 41 to effectively hold the same against spreading. Each vertical web 39 also cooperates with the connected guide flange 41 to provide an extremely rigid support for each bracket plate 40.

In the tread belt shown, the truss function is effected by the use of a pair of truss chains applied, respectively, to the two rows of bracket plates 40 at opposite sides of and above the row of track plates 37. Alternate links 44 of each chain comprise U-shaped structures, which will be hereinafter termed the "anchor" links. The other links 45 of each chain will be hereinafter termed the "connector" links.

The forward and rear legs or posts of each anchor link 44 have tapered end portions 46 having a wedge-like fit within tapered holes 47 in the opposite ends of the supporting bracket plate 40, and each leg terminates in a reduced portion, threaded to receive a retainer nut 48. It will be observed that each bracket plate 40 extends outwardly from its supporting guide flange 41 so that the nuts 48 are readily accessible.

Each pair of bracket plates 40 is centrally disposed above and between the hinge centers of each shoe, and both are somewhat shorter than the shoe pitch so as to permit a hinge action between shoes sufficient to permit the tread belt to form end loops about the rollers 11. The external end faces 49 of each anchor link are preferably substantially flat, as indicated in Figs. 3 and 4, and each end face 49 lies in a plane passing through the adjacent hinge center and through the adjacent end 50 of the supporting bracket plate. The longitudinal bar 51 of each anchor link is of substantially uniform cross section from end to end and preferably concavely arched, as indicated in Fig. 4, so as to form relatively high thick corners 52 at the junctions thereof with the end legs or posts, and so as to thereby provide ample strength at those points. The face 53 of each bracket plate 40 is also preferably concavely curved to match the curvature of the bar 51, so that each bracket plate cooperates with the bar 51 to form in effect a longitudinally curved link.

The connector links 45 of each chain are of substantially straight rectangular form, and each is interlooped with the anchor links 44 of successive shoes. Each of the transverse end bars 54 of each connector link are of a width to permit a free sliding action thereof between the bar 51 of the connected anchor link and the face 53 of the cooperating bracket plate, and the external end faces 55 of each connector link is preferably sloped, as indicated, so as to provide an extended bearing surface well adapted to meet the corresponding end faces of the adjacent connector links during travel of the tread shoes about the end rollers 11.

The links of both chains coact to limit the hinge action between shoes and, together, cooperate with the shoe hinges to form a truss structure by which the lower run of the tread belt is rigidly sustained against bending and thus provides a rigid track or bridge extending from one end roller 11 to the other. While thus functioning, the links of both chains are subjected to very heavy tension, causing tremendous pressures between the internal end faces 56 and 57 of the anchor and connector links. Each of these faces is preferably curved both longitudinally and transversely so as to exactly match the curvature of its coacting face to thereby effect a distribution of this pressure over the areas of both faces.

During travel of the tread shoes about the end rollers 11, the end bars 54 of the connector links 45 slide freely within the anchor links 44, to thereby permit the required fore-shortening of the truss chains, and during this action the internal end faces 56 and 57 of the links separate so that ordinarily foreign matter would be admitted therebetween, causing wear on those faces. Accumulation of such matter would cause clogging and a permanent fore-shortening of each truss chain to such an extent as to impair its functioning. I have found that by reducing these faces 56 and 57 to a minimum, consisted with load sustaining capacity, permanent lodgment of foreign matter therebetween is correspondingly reduced. It has been possible to greatly reduce these faces by employing a plurality of chains. In this instance two chains are employed and the areas of the two faces 56 and 57 are reduced by one half over what would be required if a single chain of like capacity were employed. By this means, I have greatly reduced the chain clogging tendency.

As an additional means for preventing chain clogging, I have employed a special link formation which effectively discourages the admission of foreign matter between the faces 56 and 57. In the truss chains shown, this is accomplished by providing upstanding flanges 58 on the longitudinal bars of the connector links, which cooperate with the sides of the longitudinal bars 51 of the adjacent anchor links in such manner as prevent entry of foreign matter from above into the gaps between the faces 56 and 57.

It will be observed that the flanges 58 on the connector links also, by reason of their cooperation with the bars 51 of adjacent anchor links, serve to guide the connector links and thereby retain the same in proper alignment.

It will also be noted that the connector links 45, thus guided, provide additional guides for the end rollers 11, since they are disposed at opposite sides of the central roller track and so positioned as to form in effect a continuation of the guide flanges. (See particularly Fig. 2.)

From the foregoing it will be noted that the present invention provides a truss type tread belt of simple, light weight, yet sturdy design, which may be very economically produced, which will function smoothly and with minimum wear, and which will permit the use of a single pair of single rimmed rollers of simple, light, sturdy, and economical design.

Various changes may be made in the embodiment of the invention hereinabove specifically described without departing from or sacrificing the advantages of the invention as defined in the appended claims.

I claim:—

1. A tread belt for crawler tread mechanism having a pair of spaced end rollers, said belt comprising the combination of a series of tread shoes, means for hingedly connecting said shoes, said shoes having substantially aligned surfaces together forming a central track for said rollers, guide flanges at opposite sides of said track, bracket plates extending laterally from said flanges, and a pair of spaced chains carried by said bracket plates and cooperating with said hinge means to limit the hinge action between said shoes to thereby form a rigid track spanning the space between said rollers.

2. A tread belt for crawler tread mechanism having a pair of spaced end rollers, said belt comprising the combination of a series of tread shoes, means hingedly connecting said shoes, said shoes having substantially aligned surfaces together forming a central track for said rollers, longitudinally spaced guide flanges on said shoes disposed at opposite sides of said track, and tension sustaining means disposed at opposite sides of said track for limiting the hinge action between said shoes to thereby form a rigid track spanning the space between said rollers.

3. A tread belt for crawler tread mechanism having a pair of spaced end rollers, said belt comprising the combination of a series of tread shoes, means for hingedly connecting said shoes, a central track on said tread belt, and a pair of chains disposed at opposite sides of said track and cooperating with said hinge means to limit the hinge action between said shoes to thereby form a rigid track spanning the space between said rollers.

4. A truss type tread belt for crawler mechanisms comprising a series of tread shoes, means for hingedly connecting said shoes, and a pair of parallel chains fixed to said shoes and cooperating to limit the hinge action therebetween, said chains being laterally spaced to permit passage of a roller therebetween, each of said chains comprising a series of links respectively fixed to successive shoes, each of said links having substantially flat sloping external end faces, and additional links each interlooped with a pair of said first named links.

5. In a truss type tread belt the combination of a series of tread shoes, means for hingedly connecting said shoes, and a chain connected to said shoes comprising a series of interlooped links, the adjacent internal end faces of adjacent links coacting to limit the hinge action between shoes, said chain having means for guarding against the admission of foreign matter between said faces.

6. In a truss type tread belt the combination of a series of tread shoes, means for hingedly connecting said shoes, and a chain applied to said shoes comprising a series of interlooped links, the adjacent internal end faces of adjacent links coacting to limit the hinge action between said shoes, and guard flanges on certain of said links coacting with adjacent links to discourage the admission of foreign matter between said faces.

7. In a truss type tread belt the combination of a series of tread shoes, means for hingedly connecting said shoes, and a chain applied to said shoes comprising a series of interlooped links coacting to limit the hinge action between said shoes, and longitudinal flanges on certain of said lings coacting with adjacent links to maintain said links in substantial alignment.

8. In a truss type tread belt the combination of a series of tread shoes, means for hingedly connecting said shoes, and a chain of interlooped links applied to said shoes for limiting the hinge action therebetween, longitudinal bars of certain of said links being extended into guiding relation with the longitudinal bars of adjacent links to align the same.

GEORGE C. JETT.